No. 864,706. PATENTED AUG. 27, 1907.
J. M. SMITH.
LOCKING DEVICE FOR SCREW ADJUSTMENTS.
APPLICATION FILED APR. 5, 1907.

UNITED STATES PATENT OFFICE.

JAMES M. SMITH, OF PHILADELPHIA, PENNSYLVANIA, ASSIGNOR, BY MESNE ASSIGNMENTS, OF ONE-HALF TO THE AUTOCOIL COMPANY, A CORPORATION OF NEW JERSEY.

LOCKING DEVICE FOR SCREW ADJUSTMENTS.

No. 864,706.  Specification of Letters Patent.  Patented Aug. 27, 1907.

Application filed April 5, 1907. Serial No. 366,472.

*To all whom it may concern:*

Be it known that I, JAMES M. SMITH, a citizen of the United States, residing at Philadelphia, in the county of Philadelphia and State of Pennsylvania, have invented certain new and useful Improvements in Locking Devices for Screw Adjustments, of which the following is a full, clear, and exact description.

My invention relates to a form of screw clamp or adjustment particularly adapted to the induction coils for motor vehicles and similar relation where there is considerable vibration in use, tending to derange the adjustment, but in which it is frequently necessary to intentionally vary the adjustment, for example under different road, battery, speed and other conditions.

In one construction for practically carrying out the present invention I make use of a form of bridge for supporting the vibrator contact or screw and a friction clamp or shoe which is impelled to engage the screw threads under certain circumstances, so as to frictionally bind and hold the screw in a particular relation.

This arrangement is further designed to be very simple, compact and cheap to manufacture, and of such a nature as to be very inconspicuous, if not actually invisible, in use.

Means are also provided for quickly disengaging the friction clamp or shoe whenever it is required to change the adjustment.

With these and other objects in view the invention consists in the features of construction and combination hereinafter set forth and claimed.

Figure 1:
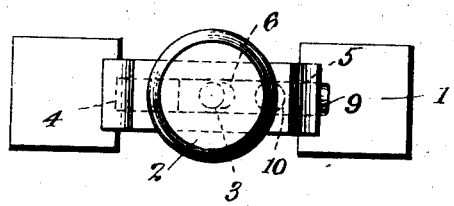
Figure 2:
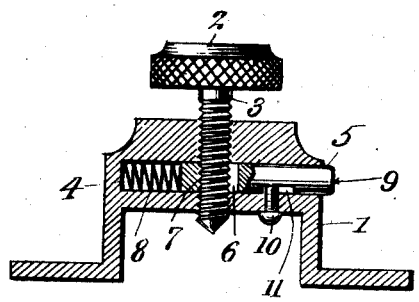
Figure 3:
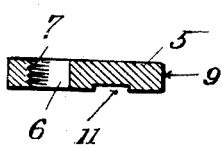

In the drawings: Figure 1 is a top view of a bridge and vibrator embodying the principles of my invention. Fig. 2 is a sectional view of the same; and Fig. 3 is a detail view of the friction clamp or shoe.

Referring to the drawings in which like parts are designated by the same reference sign, 1 indicates the frame or body member for example the usual bridge of a trembler induction coil, having a vibrator screw 2. The bridge of an induction coil is ordinarily metallic and the engagement thereof with the threaded screw shank 3 is loose enough so that the screw may be easily turned unless specially clamped or secured. By the present invention I provide means for frictionally engaging the threads of the screw for this purpose.

The body of the bridge 1 is laterally recessed or drilled with a cavity 4, which extends through the interior thereof in the direction of its long dimension. This cavity 4 furnishes a guide for the plunger 5, which constitutes the spring clamp or shoe. The plunger 5 has a slightly elongated opening 6, preferably threaded at 7, on at least one side thereof. When the friction clamp or shoe is positioned within the recess 4, the screw shank 3 is adapted to pass downwardly through the opening 6.

8 indicates a spring which is located in the inner end of the recess 4 and tensioned to press the friction clamp or shoe 5 outwardly. Under this pressure one side of the opening 6 bears tightly against the threaded screw shank 3, and this engagement is tight enough to prevent the screw from turning under any accidental cause, particularly if one side of the opening 6 is threaded as shown at 7.

An additional feature of my invention consists in making the friction clamp or shoe 5 long enough to project slightly from the open end of the recess 4, as shown at 9. This permits the easy disengagement of the friction clamp or shoe from the screw shank at any time by merely pressing the end 9 thereof. Accordingly when it is desired purposely to manipulate the vibrator screw, the part 9 is initially depressed after which the screw is freely revoluble.

10 indicates a small set screw projecting through the body of the bridge 1 into a recess 11 of the plunger 5. This set screw serves to prevent the part 5 from being accidentally turned out of its proper angular relation in the recess or forced out of the recess when the vibrator screw 2 is wholly removed for any purpose.

What I claim, is:—

1. In combination, a bridge for an induction coil having a vibrator screw in threaded engagement therewith, a friction clamp or shoe slidable in and guided on all sides by said bridge, said shoe having an elongated opening to receive said screw, and a spring for impelling said shoe in a direction to frictionally bind against the threads of said screw.

2. A screw adjustment comprising a bridge having a screw, said bridge having a recess extending laterally therethrough, a plunger slidable in and guided wholly on all sides by the walls of said recess, and having an elongated opening through which the screw passes, and a spring for impelling said plunger into clamping engagement on the screw threads.

3. A screw adjustment comprising a member having a screw, said member having a recess extending laterally therethrough, a plunger movable in said recess and having an elongated threaded opening through which the screw passes, and a spring for impelling said plunger into clamping engagement on the screw threads.

4. A screw adjustment comprising a member having a screw, said member having a recess extending laterally therethrough, a plunger movable in said recess and having a partially threaded opening through which the screw passes, and a spring for impelling said plunger into clamping engagement on the screw threads.

5. A screw adjustment comprising a member having a screw, said member having a recess extending laterally therethrough, a plunger freely movable therein and having a partially threaded opening through which the screw passes, a spring impelling said plunger into clamping relation on the screw threads, said plunger having an end projecting outward through the open end of said cavity whereby it may be depressed to release said clamping engagement.

6. A screw adjustment comprising a member having a vibrator screw, said member having a recess extending laterally therethrough, a plunger freely movable therein and having a partially threaded opening through which the screw passes, a spring impelling said plunger into clamping relation on the screw threads, said plunger having an end projecting outward through the open end of said recess whereby it may be depressed to release said clamping engagement, and means for limiting the movement of said plunger in its recess.

7. A screw adjustment comprising a member having a vibrator screw, said member having a recess extending laterally therethrough, a plunger freely movable therein and having a partially threaded opening through which the screw passes, a spring impelling said plunger into clamping relation on the screw threads said plunger having an end projecting outward through the open end of said cavity whereby it may be depressed to release said clamping engagement, and a set screw for limiting the movement of said plunger in its recess.

In witness whereof, I subscribe my signature, in the presence of two witnesses.

JAMES M. SMITH.

Witnesses:
WALDO M. CHAPIN,.
MAY BIRD.